United States Patent [19]

LaRue

[11] Patent Number: 4,630,988
[45] Date of Patent: Dec. 23, 1986

[54] BULK MATERIAL HOPPER
[75] Inventor: Donald D. LaRue, Ionia, Iowa
[73] Assignee: Hydrotile Machinery Company, Nashua, Iowa
[21] Appl. No.: 629,794
[22] Filed: Jul. 11, 1984
[51] Int. Cl.[4] .............................................. B65G 65/00
[52] U.S. Cl. .................................... 414/327; 198/525; 222/415
[58] Field of Search ............................. 414/325–327, 414/507, 519, 520, 526–528; 222/415, 564; 198/525

[56] References Cited

U.S. PATENT DOCUMENTS

| | | | |
|---|---|---|---|
| 1,177,353 | 3/1916 | Pratt | 414/327 |
| 2,466,923 | 4/1949 | Woodard | 414/519 |
| 3,085,789 | 4/1963 | Heider | 366/133 |
| 3,153,494 | 10/1964 | Heider | 222/136 |
| 3,356,270 | 12/1967 | Heider | 414/520 X |
| 3,399,466 | 9/1968 | Hartley | 198/525 X |
| 3,469,719 | 9/1969 | Peterson | 414/327 |
| 3,647,096 | 3/1972 | Holland | 414/528 |
| 4,106,643 | 8/1978 | McGehee | 414/528 |
| 4,436,226 | 3/1984 | Aggen | 222/415 X |

FOREIGN PATENT DOCUMENTS 2342097 3/1974 Fed. Rep. of Germany ...... 414/507

Primary Examiner—Joseph E. Valenza
Assistant Examiner—David A. Bucci
Attorney, Agent, or Firm—Burd, Bartz & Gutenkauf

[57] ABSTRACT

A material handling hopper has an open top box with a chamber for holding bulk material. A bottom conveyor operates to remove material from the chamber. A divider located in the chamber reduces the bridging and packing of material in the chamber. The divider is an inverted V-shaped member secured to end walls of the box. The width of the inverted V-shaped member increases in the direction of movement of the conveyor. The divider is covered with low friction material to facilitate the flow of material around the divider.

15 Claims, 9 Drawing Figures

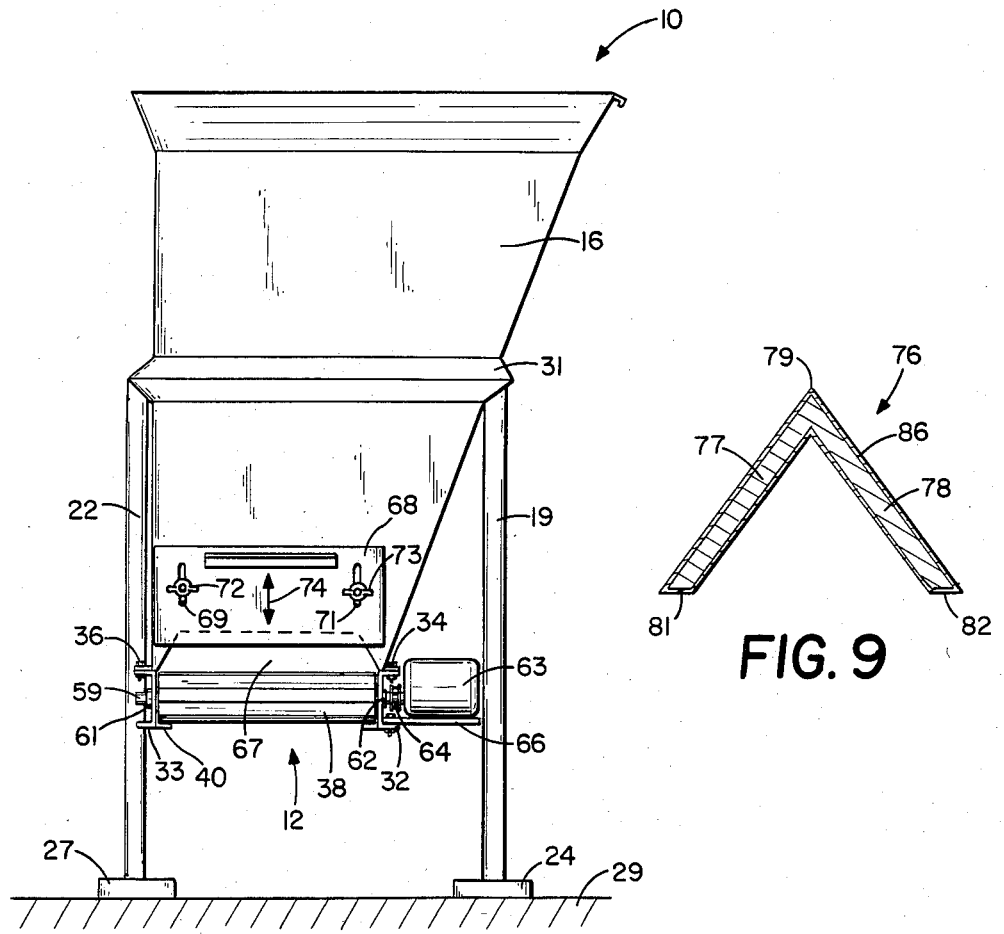
FIG. 6
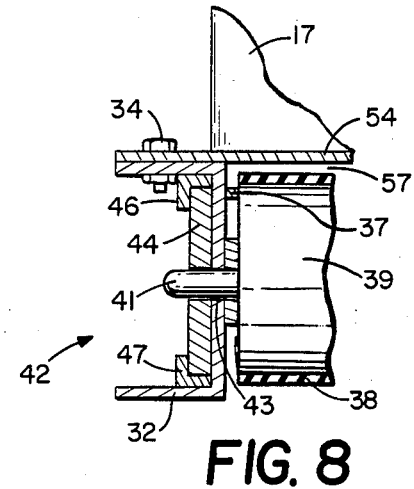
FIG. 9
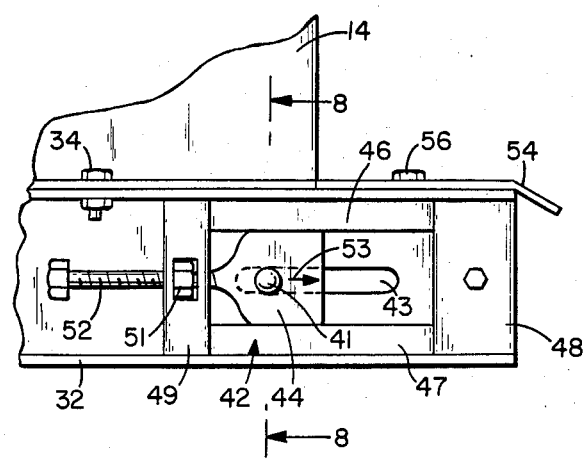
FIG. 7
FIG. 8

BULK MATERIAL HOPPER

FIELD OF INVENTION

The invention is directed to a bulk material handling apparatus having a hopper for storing material and a conveyor for removing material from the hopper. This apparatus is known as a self unloading wagon or box used to handle particulate materials, such as grains, animal feeds, gluten, granular fertilizer, and the like.

BACKGROUND OF INVENTION

Hoppers equipped with conveyors are used to handle diverse types of bulk materials. These materials vary in particle size from finely ground feed materials to grains as shelled corn and soybeans. The moisture content of the material usually varies so that the material can pack and bridge in the hopper. Sticky material, such as gluten, is difficult to handle in conventional hoppers. Bridging and packing of gluten in the hoppers are problems.

Feed mixing boxes equipped with augers are used to carry and mix particulate feeds. Examples of feed mixing boxes are disclosed by Heider in U.S. Pat. Nos. 3,085,789; 3,153,494; and 3,356,270. These boxes have shields and covers located in the boxes over the augers. Vertical walls are used to divide the box into two chambers. The shields and covers each have uniform width and function to regulate the flow of material from the auger located along the bottom of the box. Bridging of material in the box chambers is reduced with movable valve gates. The gates are adjustable to control the flow of material from the hopper chambers to the auger.

SUMMARY OF INVENTION

A material handling apparatus has a box for holding bulk material and a conveyor for removing material from the box. The bulk material can be sticky gluten or dry flowable particulate material. A divider means is located within the box above the conveyor to facilitate the flow of material to the conveyor and reduce bridging and packing of material within the box. The divider means has a width that increases in the direction of movement of the conveyor.

The preferred form of the divider means is a converging elongated inverted V-shaped divider member secured to the end walls of the box and located within the box chamber above the conveyor. The divider member has generally flat side walls. Each side wall has a lower linear edge extended downwardly and outwardly from one hopper end wall to the opposite hopper end wall so as to increase the width of the divider means along the length thereof. The divider member is a rigid member located along the central line of the conveyor that reduces bridging and packing of the material in the chamber and facilitates the flow of material in the chamber to the conveyor. The outer surfaces of the divider side walls can be coated with low friction material, such as PTFE. Low friction material reduces the adherence of sticky material, such as gluten, on the divider side walls.

One end wall of the box has an outlet opening. An adjustable gate mounted on this end wall is used to provide a regulated even flow of material from the hopper. A desired amount of material can be metered by the conveyor to a desired location, such as an animal ration. The metering of a substantially constant amount of material by the conveyor is maintained by the continuous supply of material in the hopper. The divider member reduces bridging and packing of material in the chamber to ensure a continuous supply of material to the conveyor.

The material handling apparatus is rugged in construction and versatile in use. It can be installed with a minimum of labor in a relatively short period of time. The material discharge can be from either the right or left end of the hopper. These and other advantages of the material handling apparatus of the invention are embodied in the following example of the apparatus.

DESCRIPTION OF DRAWING

FIG. 6 is a front elevational view of the material handling apparatus of FIG. 1;

FIG. 7 is an enlarged side view of the adjustable mount for the conveyor of the material handling apparatus of FIG. 1;

FIG. 8 is a sectional view taken along the line 8—8 of FIG. 7; and

FIG. 9 is an enlarged sectional view taken along the line 9—9 of FIG. 2;

DESCRIPTION OF PREFERRED EMBODIMENT

Figure 1:
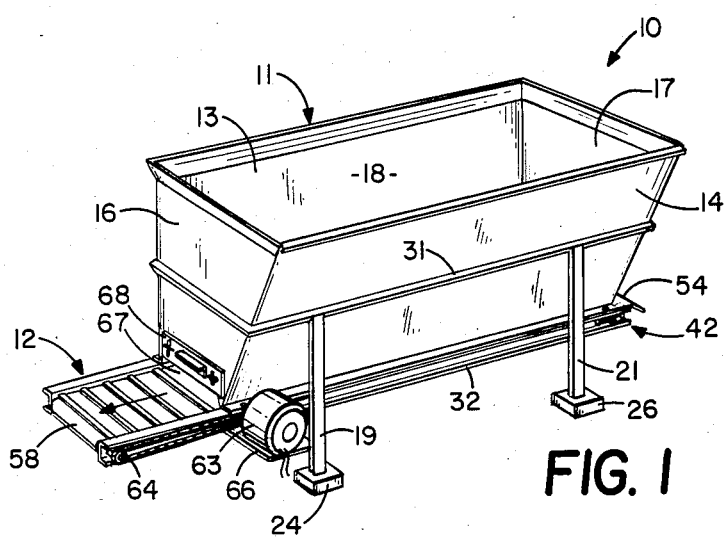
FIG. 1 is a perspective view of the material handling apparatus of the invention.
Figure 2:
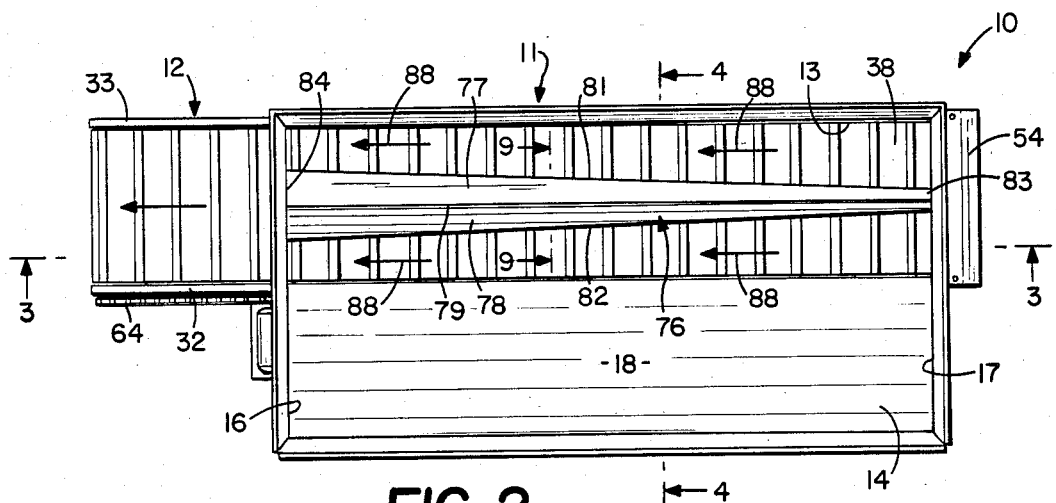
FIG. 2 is an enlarged top view of FIG. 1.
Figure 3:
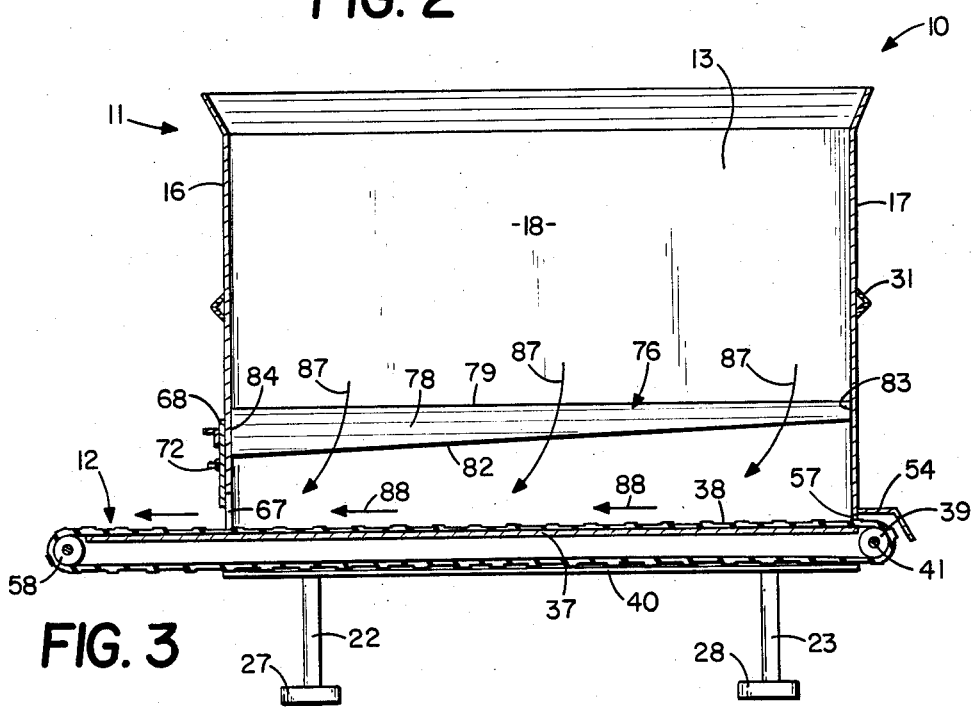
FIG. 3 is a sectional view taken along the line 3—3 of FIG. 2.

Referring to FIGS. 1 to 3, there is shown a material handling apparatus of the invention indicated generally at 10. Apparatus 10 is known as a hopper used to store bulk material, such as animal feeds, gluten, grains, fertilizers, and like granular and particulate materials. Hopper 10 has the box indicated generally at 11 having a chamber 18 for accommodating the bulk material. A conveyor indicated generally at 12 located along the bottom of box 11 is operable to remove the bulk material from chamber 18 and discharge the bulk material to a desired location. Box 11 has an upright side wall 13, an outwardly inclined side wall 14 joined to a generally upright front wall 16 and an upright rear wall 17. Walls 13, 14, 16 and 17 surround chamber 18 for accommodating the bulk material. The top of box 11 is flared outwardly and opens to facilitate the loading of the bulk material to chamber 18. Box 11 is supported on a support or foundation 29 with a plurality of upright legs 19, 21, 22 and 23. The legs 19 and 21 are secured to midsections of side wall 14 and extend in a downward direction. The bottom of legs 19 and 21 are attached to blocks 24 and 26. As shown in FIGS. 3, legs 22 and 23 extend downwardly from the side wall 13. The lower ends of the legs 22 and 23 are attached to blocks 27 and 28. Blocks 24, 26, 27 and 28 are generally square foot members located on support 29. The upper ends of legs 19, 21, 22, and 23 are attached to a rib 31 secured to the mid-sections of side walls 13 and 14 and front and rear walls 16 and 17. Rib 31 provides reinforcement for walls 13, 14, 16 and 17.

Figure 4:
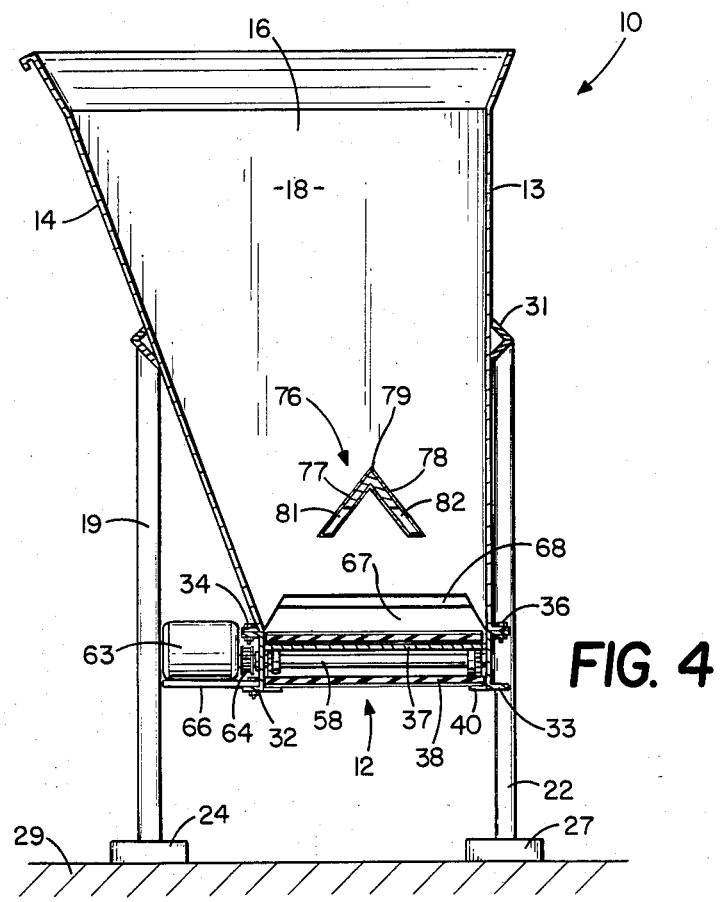
FIG. 4 is an enlarged sectional view taken along the line 4—4 of FIG. 2.
Figure 5:
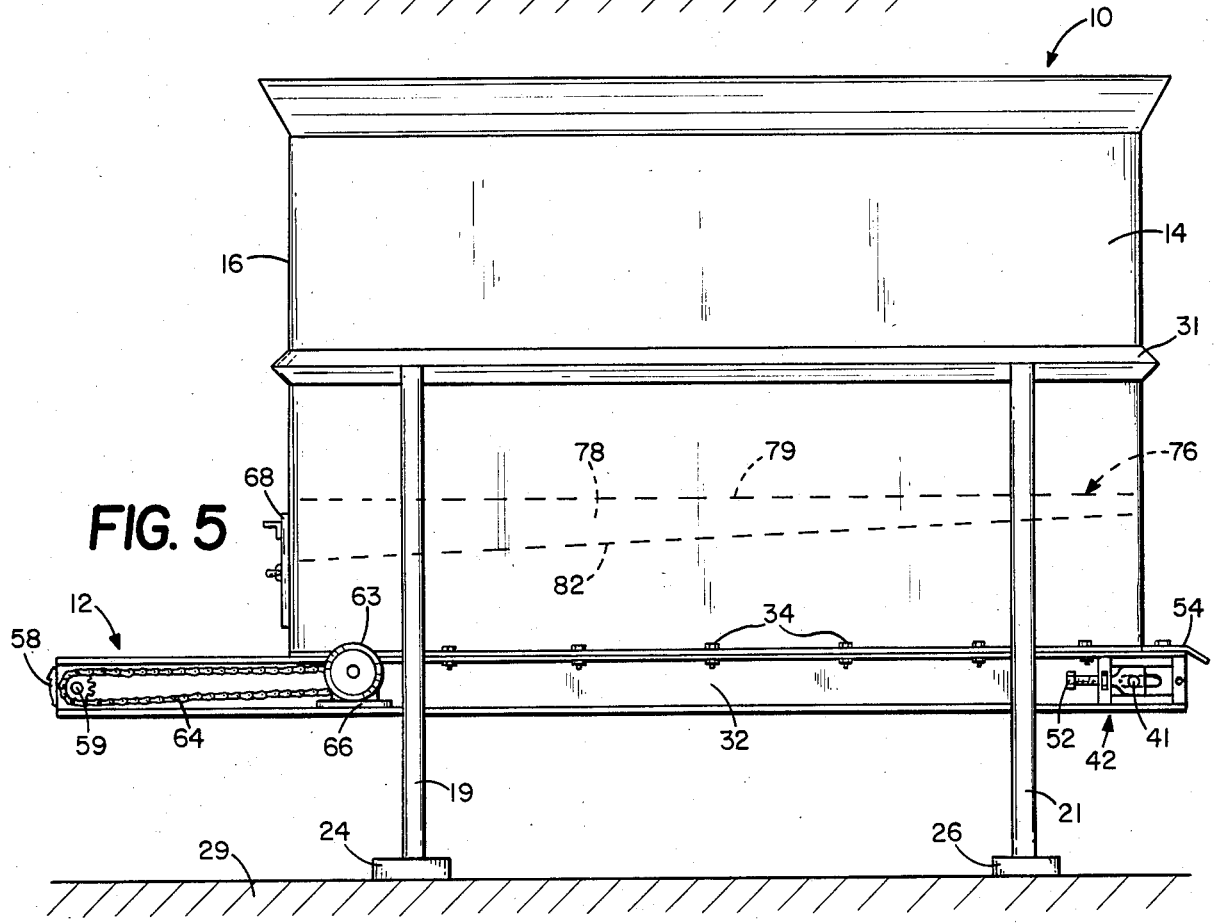
FIG. 5 is a side elevational view of the material handling apparatus of FIG. 1.

As shown in FIGS. 4 and 5, a pair of horizontal channel members 32 and 33 are secured to the lower ends of the side walls 13 and 14 with nut and bolt assemblies 34 and 36 respectively. A generally horizontal bottom wall or floor 37 extends between and is secured to channel members 32 and 33. Conveyor 12 has endless conveyor 38, such as endless chains and transverse paddles or an endless belt having a top run along the top of floor 37. An idler roller 39 is located adjacent the bottom of end wall 17. Roller 39 has oppositely directed axles 41 rotatably mounted on adjustable mounts indicated generally at 42.

Referring to FIGS. 7 and 8, there is shown a mount 42 for adjusting the tension of endless conveyor 38. Mount 42 is located within channel member 32 adjacent an elongated longitudinal slot 43 in the side wall of channel member 32. A plate 44 accommodating the end of shaft 41 is located adjacent the side wall of channel member 32. Shaft 41 extends through slot 43 into a central hole in plate 44. Plate 44 is retained in sliding assembled relation with channel member 32 with a pair of angle bars 46 and 47. As shown in FIG. 8, angles bars 46 and 47 provide upper and lower grooves or guideways for plate 44. A first stop member 48 is secured to the channel member 32 adjacent the outer ends of the angle bars 46 and 47. A second stop member 49 is located adjacent the opposite or inner ends of the angle members 46 and 47. Stop member 49 has a central hole captivating a nut 51. A bolt 52 threaded through nut 51 engages plate 44. Bolt 52 is adjustable to longitudinally move plate 44 as indicated by arrow 53. An adjustable mount (not shown) secured to channel member 33 accommodates the opposite end of shaft 41. This mount is identical to mount 42. The tension of endless conveyor is adjusted by adjusting the bolts of the mounts.

A transverse cover 54 is supported on the ends of channel members 32 and 33. Nut and bolt assemblies 56 secure cover 54 to channel members 32 and 33. Cover 54 closes transverse opening 57 between the bottom of end wall 17 and floor 37.

The discharge end of endless conveyor 38 is trained over a drive roller 58 located between channel members 32 and 33. Drive roller 58 is power driven with an electric motor 63. Other types of motors or drive systems can be used to power roller 58. A chain and sprocket drive 64 operatively connects motor 63 to shaft 59. Motor 63 is supported on a platform 66 attached to channel member 32. As shown in FIG. 5, motor 63 is located under the slant wall 14 adjacent leg 19. Motor 63 is positioned in a protective location to provide a minimum interference with the utility of the material handling apparatus.

As shown in FIGS. 3, 4 and 6, the bottom of front wall 16 has a transverse opening 67 providing an outlet for the bulk material in chamber 18. The top run of the belt 38 moves through the opening 67 to carry a metered amount of material to the discharge location. A gate 68 located adjacent front wall 16 is used to control the size of outlet opening 67. Gate 68 has a pair of vertical slots 69 and 71 accommodating fasteners 72 and 73 used to adjustably position the gate on the front wall 16. The gate 68 is vertically adjustable as indicated by the arrow 74 to control the size of outlet opening 67 and thereby control the amount of material moved from chamber 18 by the endless conveyor 38.

As shown in FIGS. 2, 3, and 4, a longitudinal divider indicated generally at 76 is located in chamber 18, between end walls 16 and 17 above conveyor 12. Divider 76 is centered along the longitudinal center line of the top run of endless conveyor 38. The vertical distance between divider 76 and endless conveyor 38 allows the material to be moved by conveyor 12 toward end wall 16. For example, the vertical distance between endless conveyor 38 and divider 76 is 41 cm. Other vertical distances can be used.

Divider 76 is a one-piece rigid member having a generally inverted V-cross-sectional shape. The longitudinal center of divider 76 is located in the central vertical plane of the conveyor 12. Divider 76 is located above endless conveyor 38 and extends generally parallel to the top run of endless conveyor 38. Divider 76 has a pair of downwardly and outwardly directed longitudinal side walls 77 and 78 joined together at a top apex or ridge 79. The angle between divider side walls 77 and 78 is not greater than 90 degrees. An angle of less than 90 degrees provides less resistance to the movement of material in chamber 18. The ridge 79 runs along a generally horizontal plane extended between end walls 16 and 17 as shown in FIG. 3. Side wall 77 has a lower edge 81 that is directed upwardly from front end wall 16 to rear end wall 17. Side wall 78 has a lower edge 82 that extends upwardly from front wall 16 to rear wall 17. Divider 76 has a first end 83 secured to wall 17 and a second end 84 secured to wall 16. Divider 76, being secured to walls 16 and 17, stabilizes and reinforces these walls. Divider 76, being a one-piece rigid member that spans the length of chamber 18, reduces the weight of material on conveyor 12 and the lower portions of box side walls 13 and 14. Divider 76 reduces the packing of material on endless conveyor 38 as part of the weight of the material in chamber 18 is borne by the one-piece divider 76. Referring to FIG. 9, divider 76 has an outer surface or coating 86. The coating 86 is the low friction plastic such as polytetrafluoroethylene (PTFE), commonly known by the commercial tradename of "Teflon".

As shown in FIGS. 2, 3 and 4, divider 76 has a large end located over the outlet opening 67. The side edges 81 and 82 taper upwardly toward the end 83 and thereby increase the openings between side members 77 and 78 and side walls 13 and 14. The material flows through the openings from the upper regions of chamber 18 to conveyor 12 as indicated by the arrows 87 in FIG. 3. The material is carried by moving endless conveyor 38 in the direction of arrows 88 through outlet opening 67. The excess material moved by endless conveyor 38 toward end wall 16 moves upwardly and is directed rearwardly by the bottom of divider 76. The converging shape of divider 76 from end wall 16 to end wall 17 causes the rearwardly flowing material to move outwardly and back to endless conveyor 38. This occurs along a substantial portion of the length of divider 76 so as to reduce the packing of the material in chamber 18. The material is discharged from conveyor 12 to a desired location or a second conveyor which carries the material to the desired location. Divider 76 increases in width and height from end wall 17 to end wall 16 as shown in FIG. 2. This reduces the packing of the material against end wall 16 and minimizes the bridging of the material in chamber 18. The material is free to flow adjacent the opposite side walls 77 and 78 of divider 76 onto the moving belt 38. The material does not stick to divider 76. The PTFE coating 86 on divider 76 aids the flow of material to endless conveyor 38.

In use, the material is loaded in chamber 18 through the open top with a tractor loader, conveyor and like machine. Motor 63 is connected to a source of electrical power with a conventional switch. The motor 63 via the chain and sprocket drive 64 rotates drive roller 58. This moves endless conveyor 38 over floor 37. The material on endless conveyor 38 is moved in a direction of arrows 88 through outlet opening 67. Gate 68 is adjusted to control the amount of material that is allowed to move through opening 67. The material in chamber 18 moves downwardly along opposite sides of divider 76 to endless conveyor 38. The material moves under divider 76 toward end wall 16. A portion of the material is forced through outlet opening 67. The remainder of the material flows upwardly and rearwardly. The rearwardly flowing material moves outwardly and back toward endless conveyor 38. The divider 67 reduces the bridging of material in chamber 18 and packing of material against end wall 16. The continued operation of motor 63 provides continuous discharge of material from conveyor 12.

While there has been shown and described one embodiment of the material handling apparatus of the invention, it is understood that changes in the size, shape, and structures may be made by those skilled in the art without departing from the invention. The invention is defined in the following claims.

The embodiments of the invention in which an exclusive property or priviledge is claimed are defined as follows:

1. A material handling apparatus comprising: box means having generally upright first and second end walls, a bottom wall, longitudinal side walls with one side wall upright and the other side wall upwardly and outwardly inclined, and a chamber for accommodating material surrounded by said walls, said first end wall having a material outlet opening in the bottom portion thereof, said bottom wall extended outwardly away from the first end wall, conveyor means located along the bottom wall of the box means and extended through said outlet opening and away from the first end wall, operable to move material from the chamber through said outlet opening, and away from said first end wall, drive means for moving said conveyor means, and divider means located in said chamber above said conveyor means generally parallel to the length of the conveyor means providing openings on opposite sides thereof for facilitating the flow of material in the chamber to the conveyor means, said divider means comprising an elongated inverted V-shaped divider member having opposite ends secured to said end walls, said inverted V-shaped divider member having a pair of generally flat divider side walls, said divider side walls having upper portions joined together along a generally horizontal linear apex section extended between said end walls, each divider side wall having a lower edge extended upwardly and inwardly from the first end wall to the second end wall whereby the inverted V-shaped divider member has a width that increases in the direction of movement of the conveyor means whereby the openings between the box side walls and divider means decreases from the second end wall to the first end wall and the vertical distance between the conveyor means on the bottom wall and the lower edges of the divider side walls decreases from the second end wall to the first end wall to minimize bridging and packing of material in the chamber.

2. The apparatus of claim 1 wherein: the divider means has a longitudinal center line, said divider member located directly above and extended generally parallel to said center line of the conveyor means.

3. The apparatus of claim 1 including: low friction means secured to the inverted V-shaped member.

4. The apparatus of claim 1 wherein: the angle between the divider side walls is less than 90 degrees.

5. The apparatus of claim 1 wherein: said bottom wall is a generally flat floor, said conveyor means having an endless belt movable relative to the floor to move material from the chamber through said outlet opening, and away from the first end wall, said drive means including motor means for driving the belt, said inverted V-shaped divider member being located above said belt whereby material in said chamber flows around the inverted V-shaped divider member to the endless belt.

6. A material handling apparatus comprising: a box having walls including a bottom wall surrounding a chamber for accommodating material, one of said walls having a material discharge opening adjacent said bottom wall, said bottom wall extended through said material discharge opening, conveyor means located on said bottom wall in said chamber operable to move material from the chamber, through said material discharge opening, means for operating the conveyor means, and divider means located in the chamber above the conveyor means providing openings on opposite sides thereof for facilitating the flow of material in the chamber to the conveyor means, said divider means having a pair of divider side walls, each divider side wall terminating in an outer lower edge, each outer lower edge extended downwardly and outwardly in the direction of movement of the conveyor means, said divider means increasing in width in the direction of movement of the conveyor means whereby the openings adjacent opposite sides of the divider means decrease in the direction of movement of the conveyor means and the vertical distance between the lower edges of the divider side walls decreases in the direction of movement of the conveyor means to facilitate the flow of material to the conveyor means and minimize bridging and packing of material in the chamber.

7. The apparatus of claim 6 wherein: the divider means has an inverted V-shape, said divider side walls being the sides of the inverted V-shaped divider means.

8. The apparatus of claim 7 wherein: the angle between the divider side walls is less than 90 degrees.

9. The apparatus of claim 7 including: low friction means covering said divider side walls.

10. The apparatus of claim 7 wherein: the divider side walls are joined together along a linear apex section, said apex section extended generally parallel to the conveyor means.

11. A material handling apparatus comprising: box means having generally upright first and second end walls, an upright side wall, an upwardly and outwardly inclined side wall, and a generally horizontal floor providing a chamber for accommodating material, said first end wall having a material outlet opening adjacent the floor, said floor extended through said material outlet opening, and an endless conveyor extending along said floor through said material outlet opening for moving material from the chamber through the outlet opening to a desired location, means for moving the conveyor relative to said floor, and divider means located in said chamber above and generally parallel to said conveyor providing openings on opposite sides thereof for facilitating the flow of material in the chamber to the conveyor, said divider means comprising an inverted V-shaped member having opposite downwardly and outwardly divider side walls, each divider side wall terminating in a linear outer edge, each outer edge extended downwardly and outwardly from the second wall to the first wall whereby the width of the divider means increases in direction of movement of the conveyor means and the openings between the box side walls and the divider means decreases from the second end wall to the first end wall and the vertical distance between the conveyor means on the floor and the lower edges of the divider side walls decreases from the second end wall to the first end wall to minimize bridging and packing of material in the chamber.

12. The apparatus of claim 11 wherein: the divider side walls of the inverted V-shaped member are joined together along a linear apex section, said apex section extended generally parallel to the conveyor.

13. The apparatus of claim 12 wherein: the angle between the divider side walls of the inverted V-shaped member is less than 90 degrees.

14. The apparatus of claim 11 including: low friction means covering each of the divider side walls of the inverted V-shaped member.

15. The apparatus of claim 11 including: gate means mounted on the first wall of the box means for adjusting the size of the material outlet opening.

* * * * *